United States Patent
Chen et al.

(10) Patent No.: US 8,002,178 B2
(45) Date of Patent: Aug. 23, 2011

(54) VIRTUAL MEMBERSHIP CARD SYSTEM AND PROVIDING METHOD, AND VIRTUAL MEMBERSHIP CARD READING METHOD

(75) Inventors: Ken Chen, Shanghai (CN); Lin Luo, Beijing (CN); Wei Xiong Shang, Beijing (CN); Chun Ying, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/167,576

(22) Filed: Jul. 3, 2008

(65) Prior Publication Data

US 2009/0008445 A1    Jan. 8, 2009

(30) Foreign Application Priority Data

Jul. 6, 2007  (CN) ............... 2007 1 0127998

(51) Int. Cl.
*G06K 5/00*  (2006.01)
(52) U.S. Cl. ......... 235/380; 235/492; 235/451; 235/487
(58) Field of Classification Search .............. 235/380, 235/492, 451, 487
See application file for complete search history.

(56) References Cited

U.S. PATENT DOCUMENTS

| | | | | |
|---|---|---|---|---|
| 7,529,563 | B1* | 5/2009 | Pitroda | 455/558 |
| 2006/0278698 | A1* | 12/2006 | Lovett | 235/380 |
| 2007/0118420 | A1* | 5/2007 | Jung et al. | 705/10 |
| 2009/0210347 | A1* | 8/2009 | Sarcanin | 705/67 |

FOREIGN PATENT DOCUMENTS

| | | |
|---|---|---|
| CN | 1804906 | 7/2006 |
| KR | 5023000 | 3/2003 |

OTHER PUBLICATIONS

"Mobile Phone becomes 'state ID' for Finns", www.smarttrust.com (accessed Sep. 23, 2008).
Boyd, John, "A cellphone full of dollars", www.newscientist.com/article/mg18324574.300, Jul. 24, 2004.

* cited by examiner

*Primary Examiner* — Edwyn Labaze
(74) *Attorney, Agent, or Firm* — William Stock; Anne Vachon Dougherty

(57) ABSTRACT

A method for providing virtual membership cards whereby by a card broker generates a virtual membership card based on the information of a card issuer and the information of a user and sends the virtual membership card to the mobile terminal of the user though a communication network. A virtual membership card system includes a membership management module, for managing card issuer account information, card user account information, and the virtual membership card information and a virtual membership card management module, including a card generation module, for generating a virtual membership card based on the information of the card issuer and the information of the user and a card distribution module, for sending the virtual membership card to the mobile terminal of the user though a communication network. With the present invention, merchants can easily issue, validate and maintain their membership cards, and the user may retrieve, use and manage his/her membership card at any place and at any time.

20 Claims, 10 Drawing Sheets

VIRTUAL MEMBERSHIP CARD SYSTEM AND PROVIDING METHOD, AND VIRTUAL MEMBERSHIP CARD READING METHOD

TECHNICAL FIELD

The present invention relates to e-commerce. Particularly, the present invention relates to a mechanism for providing and using a virtual membership card, and more particularly, to a virtual membership card system, a method for providing virtual membership card, a virtual membership card reading method and a virtual membership card reading device.

BACKGROUND ART

Many commercial organizations like stores, restaurants and fitness centers issue membership cards to their customers. With the membership card, a customer can use the services or buy the products offered by the card issuing organization with a differentiated service quality or at a discount. The membership cards are often made of plastic materials with the name of the card issuing organization, card image, card number, use rules, etc., printed thereon. A membership card often has an information storage section such as a magnetic strip, an IC chip, one or two dimensional bar code(s), storing therein the information of the card issuing organization and the user. The user typically carries the membership card in his/her wallet, and in use, presents the card to the card issuing organization so as to be read by a special card reading device.

The disadvantages of the conventional membership cards lie in that, if a user enjoys membership in a plurality of commercial organizations, then he or she needs to carry and manage a plurality of membership cards. For example, a modern lady often owns dozens of membership cards, and these cards will occupy a large space. Thus, the user has to use a big wallet to contain these cards, or determine in advance which cards to take with her before going out. Apparently, this is very inconvenient for the user. In addition, it will be troublesome if the user forgets to take or loses the membership card, and it may even lead to others using the membership card assuming the user's name. On the other hand, from the perspective of the merchants, due to the low usage of the membership cards caused by the inconvenience of carriage, the merchants cannot get their expected repayment for the cost of making the membership cards.

SUMMARY OF INVENTION

In view of the above problems in the prior art, the primary object of the present invention is to provide a mechanism for providing and using virtual membership cards, to facilitate the merchants to issue, validate and maintain the membership cards, and facilitate the users to retrieve, use and manage the membership at any place and at any time.

Another object of the present invention is to provide a mechanism which only allows the merchant who issues the virtual membership card and those organizations authorized by the merchant to read the virtual membership card, so as to protect the user's privacy and prevent forgery or tampering of the membership card.

A further object of the present invention is to provide a mechanism which only allows the user himself/herself to use the virtual membership card while preventing forwarding the membership card via a network.

A further object of the present invention is to provide a mechanism which assures the user that the virtual membership card is issued by a particular merchant.

In order to achieve the above objects, according to one aspect of the present invention, there is provided a method for providing virtual membership cards, including the following steps performed by a card broker: generating a virtual membership card based on the information of a card issuer and the information of a user; and sending the virtual membership card to the mobile terminal of the user though a communication network.

According to a further aspect of the present invention, there is provided a virtual membership card system, including: a membership management module, for managing card issuer account information, card user account information, and the virtual membership card information; and a virtual membership card management module, including: a card generation module, for generating a virtual membership card based on the information of the card issuer and the information of the user; and a card distribution module, for sending the virtual membership card to the mobile terminal of the user though a communication network.

According to a further aspect of the present invention, there is provided a virtual membership card reading method, including the following steps: scanning the virtual membership card displayed on a mobile terminal which is provided by a card broker, to convert it into a digital signal; and decoding and decrypting the digital signal to obtain the information of the card issuer and the information of the card user embedded therein.

BRIEF DESCRIPTION OF THE DRAWINGS

From the detailed description of the preferred embodiments of the prevent invention in conjunction with the accompanying drawings, the above mentioned and other objects, features and advantages of the present invention will become more apparent. In the drawings, the same or similar reference numbers are used to indicate the same or similar elements.

DETAILED DESCRIPTION OF THE INVENTION

Before describing the embodiments of the present invention, the terms as used in this specification will be explained first. In the context of the present application, the "virtual membership card" refers to an intangible information carrier which is generated, stored and transmitted in electronic form, for identifying a user as a member of a specific organization. For sake of simplicity, it is also referred to as "membership card" or "card" in the specification. The "card issuer" refers to an organization such as store, restaurant or fitness center, which issues membership cards to its customers, and is also called "merchant" in the specification as appropriate. Those skilled in the art can understand, however, the "card issuer" can also be a non-commercial organization. The "card broker" refers to an organization which, entrusted by the card issuer, generates, transmits and manages the virtual membership card, and is a telecommunication operator (or "operator") in the preferred embodiment of the present invention. The "card user" (or "user", "customer", "card holder") refers to the person who owns the virtual membership card issued by the card issuer and delivered by the card broker and thus enjoys membership.

Figure 1:
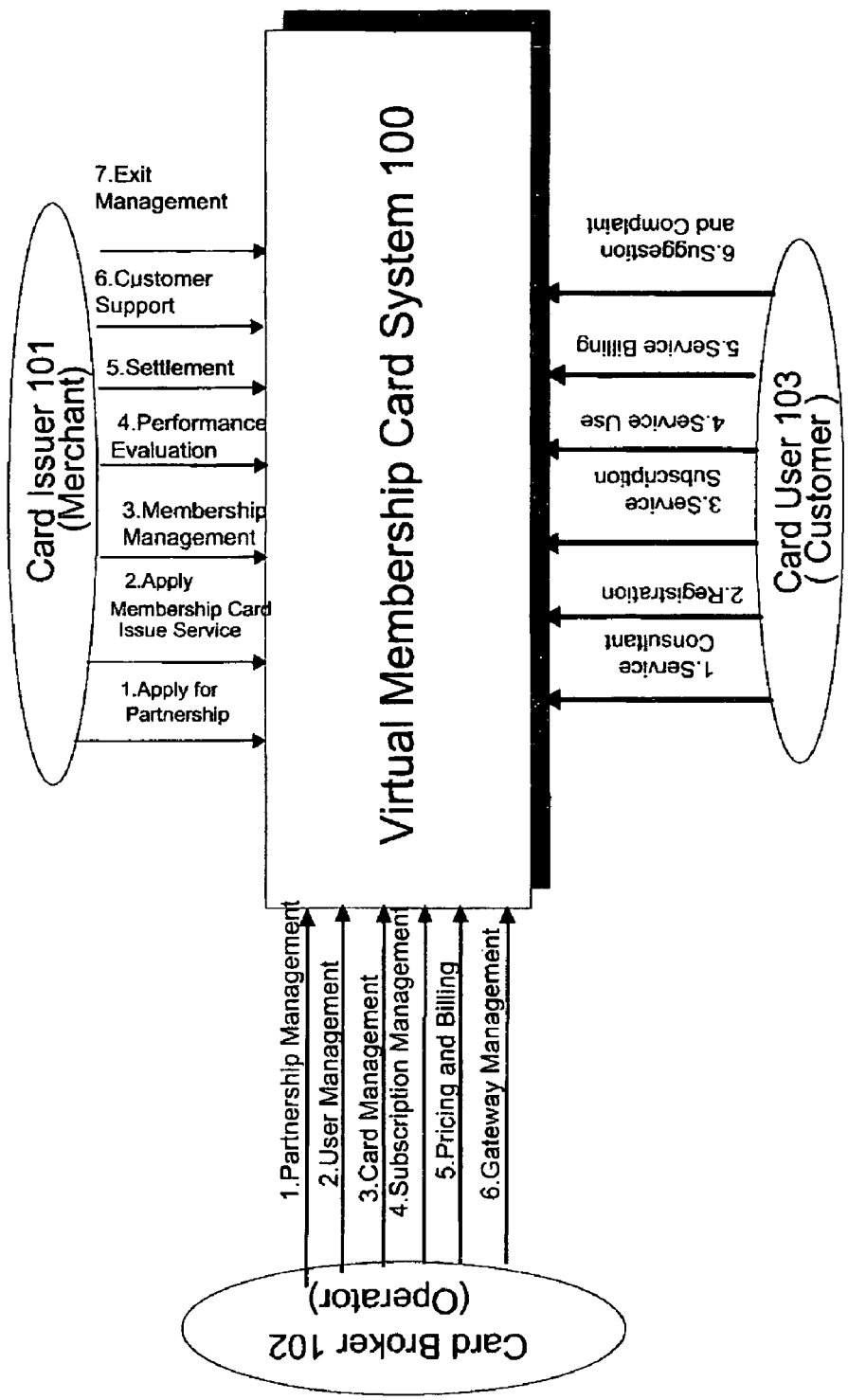
FIG. 1 shows the business context of the virtual membership card system according to an embodiment of the present invention.

According to a preferred embodiment of the present invention, a telecommunication operator cooperates with a plurality of merchants, and provides a platform for generating, delivering and managing the virtual membership cards. FIG. 1 shows the business context of an exemplary virtual membership card system 100, wherein the virtual membership card system 100 is established by the telecommunication operator 102 as the card broker. The operator 102 implements management of partner (i.e., the merchant) account information, user account information and membership card information though the virtual membership card system 100, and in addition, implements the management of the membership card subscription, pricing and billing and gateway management relating to communications, and so on. The merchant 101 may apply through the virtual membership card system 100 to the operator 102 for becoming its partner and applying for the virtual membership card issuing service, and implements membership management, customer support, performance evaluation, settlement with the operator 102 and exit management and the like through the system 100. The user 103 may implement service consulting, registration, service subscription, use and billing, and submitting suggestions and complaints, and the like through the virtual membership card system 100.

Figure 2:
FIG. 2 shows the system context of the virtual membership card system according to an embodiment of the present invention.

FIG. 2 shows the system context of the virtual membership card system 100 according to an embodiment of the present invention. Network adaptation/integration interface 201 is coupled to short message service gateway (SMSGW) 211, wireless application protocol gateway (WAPGW) 212, and multimedia message service center (MMSC) 213. SMSGW 211 is responsible for receiving the short messages sent by the short message service center (not shown), and for sending the same to the exchange center of the base station where the receiver is located. WAPGW 212 implements the transformation between the WAP protocol stack and the Internet protocol stack, and the encoding/decoding of information, so that the mobile phone (or other hand-held mobile terminal) can browse the Internet contents. MMSC 213 is responsible for storing and managing multimedia messages, including input/output of message, address resolution and the collection of billing data.

The portal interface 202 is coupled to merchant membership card self-service portal 221, user membership card self-service portal 222 and operator membership card self-service portal 223. Through the merchant membership card self-service portal 221, the merchant can perform the following operations easily through the internet: registering as a subscriber of the virtual membership card system 100, applying for creating a new membership card, applying for generating a new membership card for a user, and managing the membership card, and so on. Through the user membership card self-service portal 222, the user can perform the following operations easily through the internet: registering as a subscriber of the virtual membership card system 100, browsing the information of the merchants and the membership cards issued thereby, applying for obtaining a membership card issued by a particular merchant, and so on. Through the operator membership card self-service portal 223, the operator can perform the following operations easily: creating new account for the merchant and the user, creating a new membership card for the merchant, generating a membership card for the user, managing the merchant account information, the user account information, and the membership card information, and so on.

OSS/BSS (Operation Support System/Business Support System) integration interface 203 is coupled to a customer relationship management system 231, a converged billing and accounting system 232, a centralized mediation platform 233, and a unified provisioning platform 234 through the OSS/BSS Enterprise Application Integration (EAI) interface. The customer relationship management system 231 establishes a customer-oriented foreground operation support system, to satisfy various customer demands, to implement a uniform customer information view and customer life cycle management, to unify the functions of the business center, calling center and on-line business center and the user interface, and to unify the business procedures likes marketing, sales and customer service. The converged billing and accounting system 232 implements a converged billing and accounting function involving prepay/postpay, individual service/corporate service, and voice service/data service/value-added service. The centralized mediation platform 233 collects network source data, masks the complexity of the collection interfaces of the network element device and business platform, and performs standardized pre-processing on the original bills including formatting, association, combination and checking. The unified provisioning platform 234 performs uniform service provision management and masks the complexity of the on-line instruction interfaces of the network element device and business platform.

Figure 3:
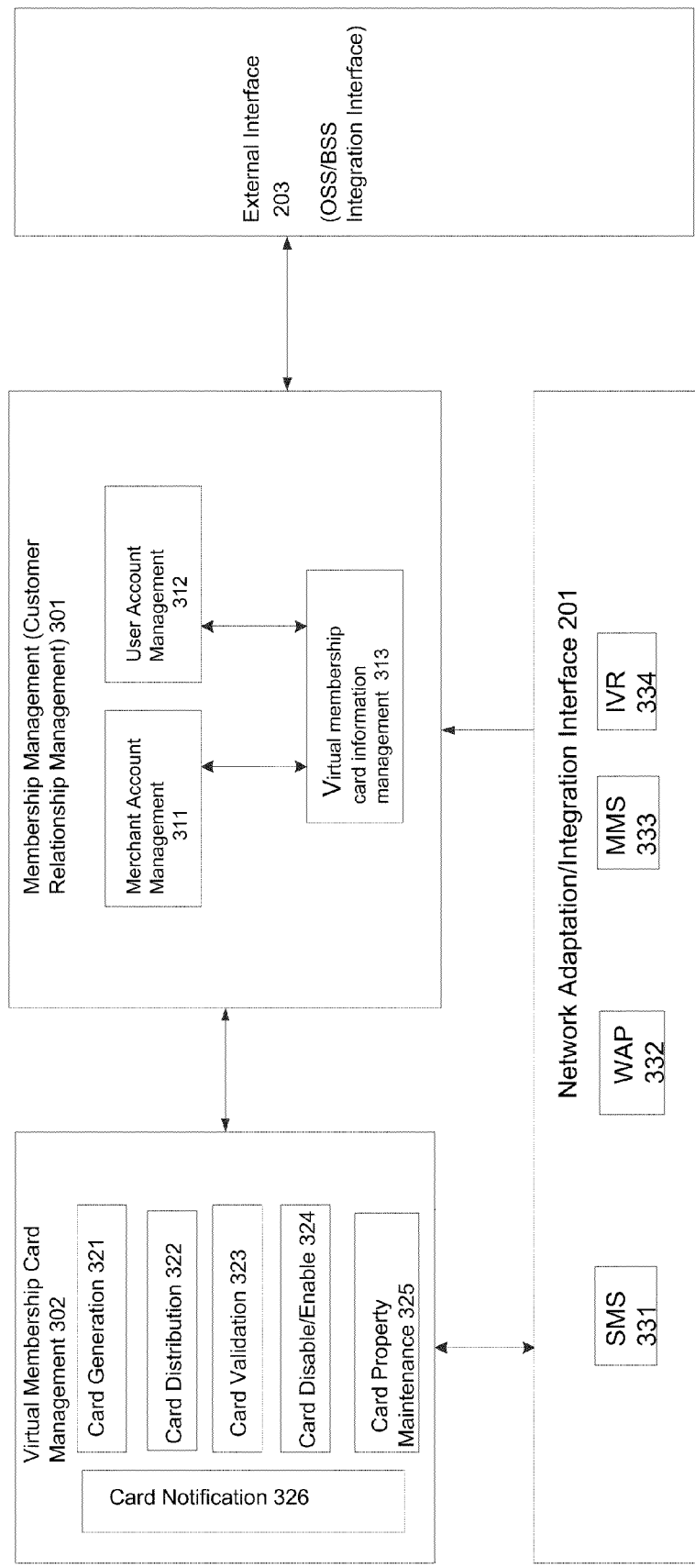
FIG. 3 shows the functional block diagram of the virtual membership card system according to an embodiment of the present invention.

FIG. 3 shows the functional block diagram of the virtual membership card system 100 according to a preferred embodiment of the present invention. The network adaptation/integration interface 201 in FIG. 2 is specifically shown in FIG. 3 as including an SMS interface part 331, a WAP interface part 332, and an MMS interface part 333. In addition, the network adaptation/integration interface 201 may also include an interactive voice response (IVR) interface part 334, to allow the merchant or the user to access the virtual membership card system 100 through voice telephone input or button selection to perform operations like registration, application and inquiry.

The network adaptation/integration interface 201 is coupled to the membership management (customer relationship management, CRM) module 301. The merchant account management module 311, user account management module 312, and the virtual membership card information management module 313 in the membership management module 301 store the information of the merchant, the user and the virtual membership card in a correlated manner, so as to establish and maintain a corresponding relationship among these three. Specifically, the operator 102 has a plurality of partners, i.e., it assumes the task of creating, distributing and managing virtual membership cards for a plurality of merchants 101. Each merchant 101 may issue one or more kinds of membership cards, for example, membership cards of different service types, or membership cards of different ranks like VIP cards and ordinary cards, and so on, to be distributed to a plurality of users 103. Each user 103 may have one or more membership cards issued by one or more merchants 101. As can be seen, a plurality of merchants and a plurality of users are correlated with each other via the membership cards. The sub-modules 311-313 in the membership management module 301 store the information of the merchants, the users and the membership cards in a correlated manner. Specifically, a record is kept for each of the various kinds of membership cards issued by each of the merchants 101. The record includes the information about the merchant 101 who issues the membership card and user 103 who owns the membership card. The record may include the type of the membership card (e.g. VIP card or ordinary card) and the card number, each kind corresponding to a card template. The card template includes the image of the card, and may also include the text describing the use rules and the like. The record also includes the encrypted information which embeds therein the merchant information and user information as the unique identification information of the user, and the method for encrypting the information will be described later in more detail. The record also includes the information about the status of the membership card like enablement, disablement (due to report of loss and expiration, etc.) and the information about the use history. The merchant information managed by the merchant account management module 311 includes, for example, the name, address, license number, and institution number of the merchant, information relating to the validation of the merchant (password), and information relating to billing, and so on. According to the preferred embodiment, the merchant account management module 311 also stores the key information of the merchant 101. The user information managed by the user account management module 312 includes, for example, the user's name, address, identification number, date of birth, and so on, and the information relating to the access of the user's mobile terminal and billing. In a preferred embodiment of the present invention, the telecommunication operator acts as the card broker 102, and thus can take full advantage of the telecommunication business database of the subscribers (who may be the merchants 101 or users 103 in the present invention) it has already established to maintain the information of the merchants and the users. In should be noted that, the above-mentioned merchant account management module 311, user account management module 312 and virtual membership card information management module 313 are defined from different perspectives for managing the virtual membership card. In fact, these three sub-modules may be implemented based on the same database.

The membership management module 301 is coupled to the external interface (OSS/BSS integration interface) 203 to implement billing-related functions. The membership management module 301 is also coupled to the virtual membership card management module 302. The virtual membership card management module 302 is responsible for the whole process of generating, distributing and managing the virtual membership card, and includes a card generation module 321, a card distribution module 322, a card validation module 323, a card enablement/disablement module 324, a card properties maintenance module 325 and a card notification module 326. The card generation module 321 is used for generating, in response to the request of the merchant 101, a membership card for a certain user. The card notification module 326 is used for notifying, after the membership card is generated, the user 103 of the event. The card distribution module 322 is used for sending the virtual membership card to the user through an electronic channel (e.g. MMS). The card property maintenance module 325 provides operating functions like adding, reducing, amending and deleting the card properties. The card properties include the card holder's information, the service rank enjoyed, the specific service items, and the like. The specific functions of these modules will be described in more detail below. Further, the virtual membership card system 100 shown in FIG. 3 includes a card validation module 323, such that the validation of the virtual membership card can be carried out at the operator 102. However, the card validation module 323 is optional. According to an alternative embodiment, the validation of the virtual membership card can be carried out at the merchant, so that a more time-effective service can be provided to the user.

FIGS. 4-7 illustrate schematically the scenarios at various stages of creating, using and managing the virtual membership card mechanism according to an embodiment of the present invention.

Figure 4:
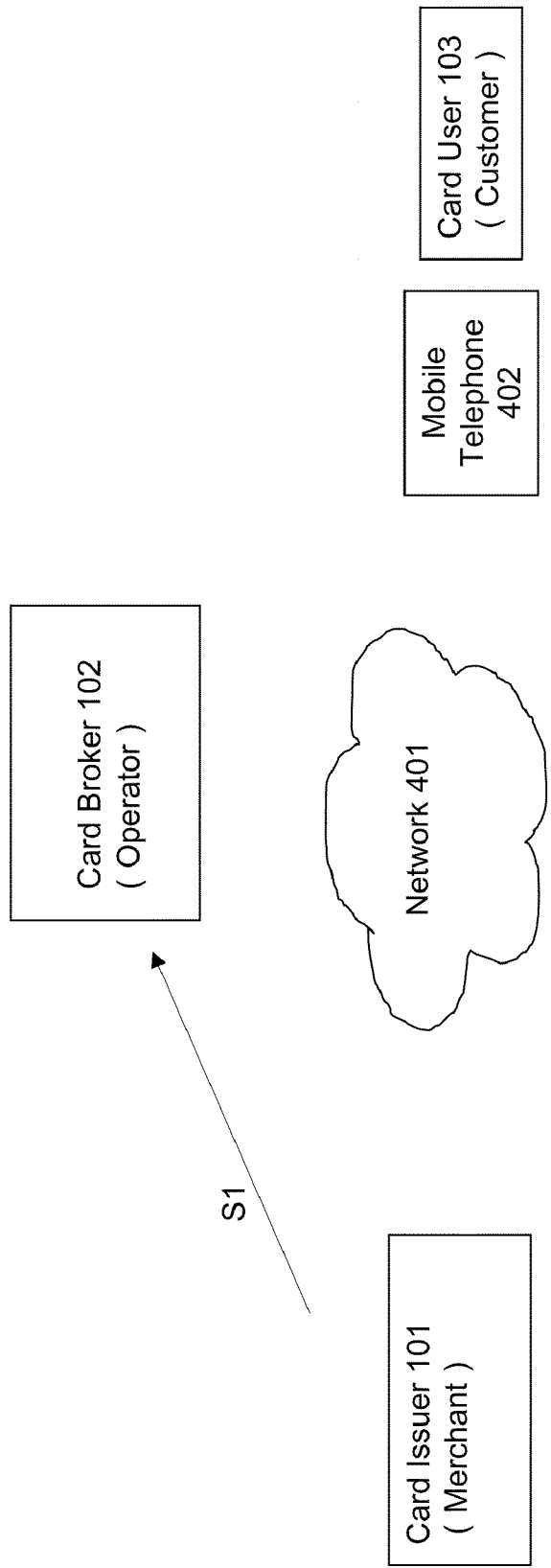
FIGS. 4-7 illustrate schematically the scenarios at various stages of creating, using and managing the virtual membership card mechanism according to embodiments of the present invention.

FIG. 4 illustrates the scenario when the merchant 101 creates a new account and creates a new membership card. In the present invention, the merchant 101 outsources its membership card management to the telecommunication operator 102. To this end, the merchant 101 needs to apply to the operator 102 for creating a new account, so as to request the operator 102 to generate membership cards for its customers and maintain the database of membership cards, as indicated by the arrow S1. The merchant 101 may first apply for registering as the operator 102's partner through the merchant membership card self-service portal 221 via the internet. Upon receiving the registration application through the portal interface 202, the virtual membership card system 100 requires the merchant to provide necessary information like the merchant's name, address, license number, institution code, password, and so on. The merchant account management module 311 (FIG. 3) creates a new account for the merchant 101, stores the merchant information, and returns a successful registration message to the merchant 101. Upon successful registration, merchant 101 may create and manage its membership cards by logging on the account. For example, when the merchant 101 needs to create a new kind of membership card, it may submit information about the name (type) and template of the membership card to the virtual membership card system 100 via network 401, said template including for example the image of the membership card and the text describing the use rules. The virtual membership card information management module 313 saves the name (type) and template information of the membership card for use in generating a particular membership card for a user.

Figure 5:
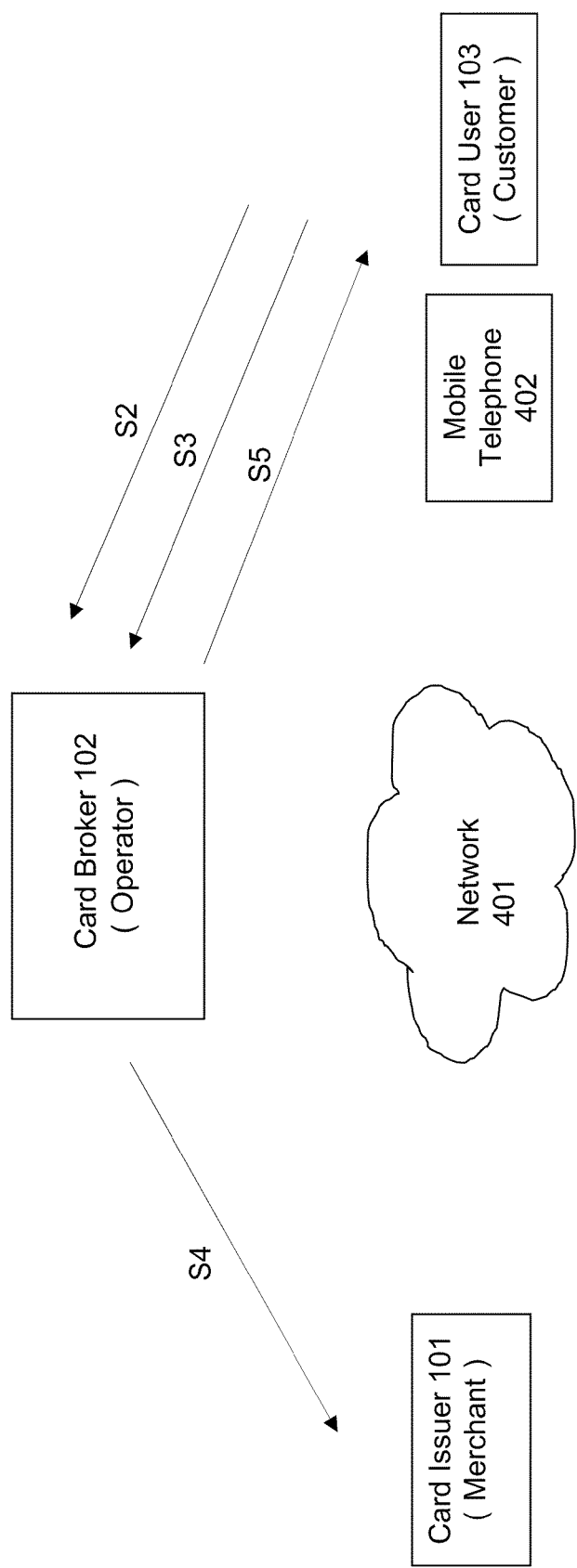

FIG. 5 illustrates the scenario when the user 103 creates a new account by applying for obtaining a membership card. Before applying for obtaining a membership card issued by a particular merchant, according to one embodiment, the user 103 needs to creates an account in the virtual membership card system 100, as indicated by the arrow S2. For example, the user 103 may apply for registering as a subscriber of the virtual membership card system 100 through the user membership card self-service portal 222 shown in FIG. 2. Upon receiving the registration application through the portal interface 202, the virtual membership card system 100 requires the user to provide necessary information, for example, name, address, identification number, date of birth, the mobile phone number, password, and so on. The user account management module 312 (FIG. 3) creates a new account for the user 103, stores the user's information, and returns a successful registration message to the user 103. Upon registration, the user 103 may apply for obtaining a membership card issued by a certain merchant by logging on the account, as indicated by the arrow S3. For example, the user may browse the information about the merchants which are partners of the operator and the various membership cards issued by the merchants through WAP access of a mobile phone, select interested membership cards therefrom, and send the selection results to the virtual membership card system 100 through the network 401, to request the membership card. The virtual membership card system 100 forwards the request to the corresponding merchant 101 for evaluation of the request by the latter, as indicated by the arrow S4. The merchant 101 evaluates the request for membership card forwarded by the operator 102 according to predetermined business rules, and notifies the user 103 of the evaluation results (the application being accepted/refused) though the card notification module 326 in the virtual membership card system 100, as indicated by the arrow S5. It should be noted that the above procedures are merely for illustration purposes but not limited. When the merchant 101 promotes its membership cards on its own initiative, for example, the steps indicated by arrows S3-S5 can be simplified. That is, instead of the user's application and the merchant's evaluation, the merchant 101 requests the virtual membership card system 100 to directly notify the user that he/she has automatically become its member. In the case where the evaluation result has come out that the application is accepted, and where the user is notified to automatically become a member, the card generation module 321 in the virtual membership card system 100 generates the virtual membership card (which will be described in more detail below). According to one embodiment, at the same time of sending the notification, the card distribution module 322 sends the generated virtual membership card to the mobile phone 402 of the user 103. According to another embodiment, the virtual membership card is not sent at the same time of sending the notification, but is sent to the mobile phone 402 of the user 103 by the card distribution module 322 when the user requests to retrieve the virtual membership card from the virtual membership card system 100 in practical use.

Figure 8:
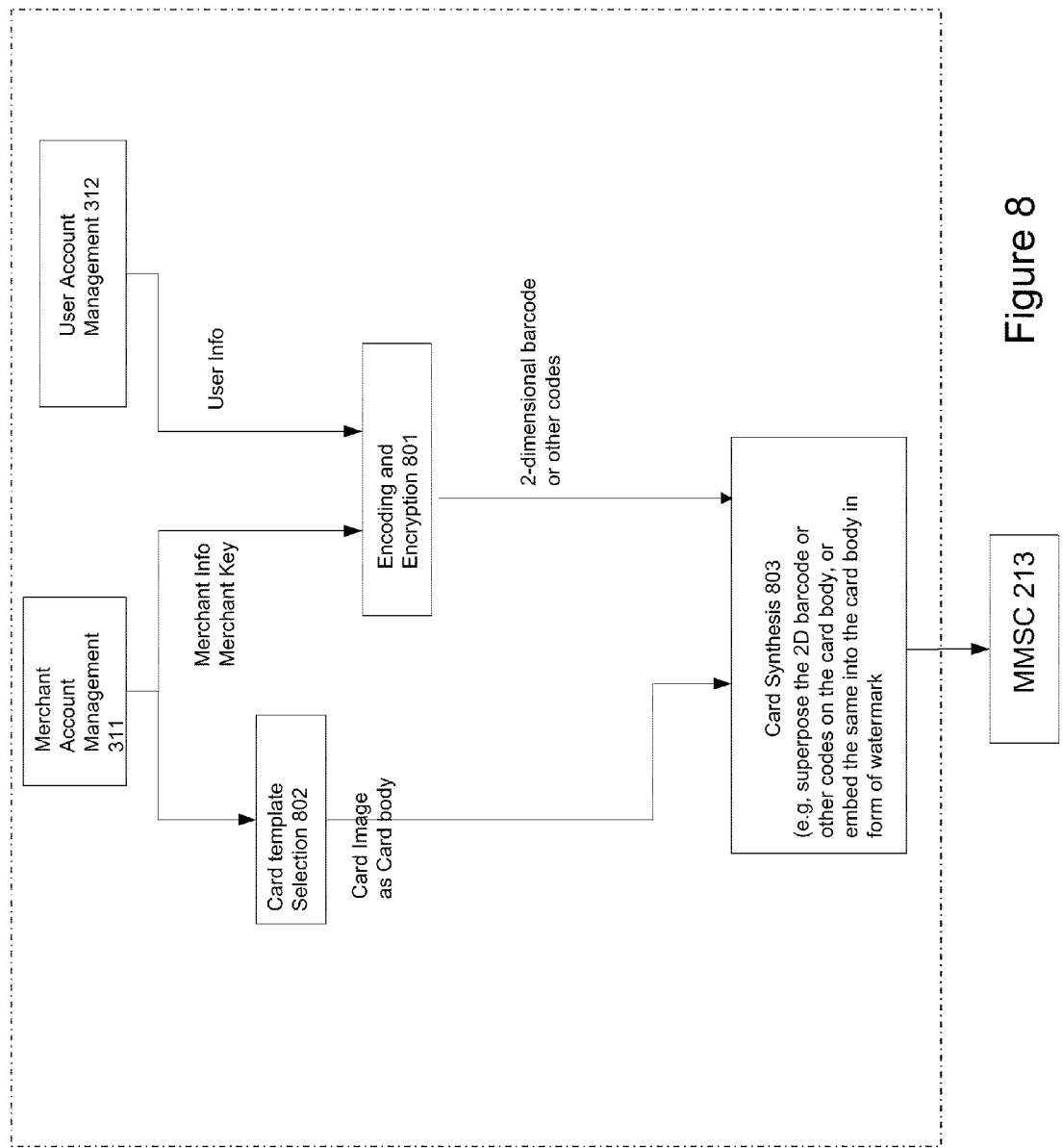
FIG. 8 shows the process of generating the virtual membership card according to a preferred embodiment of the present invention.

FIG. 8 illustrates the procedure for generating a virtual membership card according to a preferred embodiment of the present invention. The card generation module 321 (FIG. 3) extracts merchant information from the merchant account management module 311 and extracts user's information from the user account management module 312. According to the preferred embodiment, the merchant information includes information which can uniquely identify the merchant, for example, the license number, institution number, and so on. The user information includes information which can uniquely identify the user 103, such as the mobile phone number in the preferred embodiment of the present invention (which will be described in more detail below). In order to ensure the security of the membership card, the card generation module 321 also extracts the key information of the merchant 101 from the merchant account management module 311. The present invention may use a symmetry encryption method or an asymmetry encryption method, for example, encryption using public key infrastructure (PKI). At block 801, the card generation module 321 uses the merchant's encryption key to encode and encrypt the merchant information and user information. Preferably, the encoding and encrypting procedures produce a 2-dimensional bar code. Of course, other encoding methods can also be used. The virtual membership card information management module 313 stores the generated 2-dimensional bar code or other codes, as the unique identification information of the virtual membership card. The card generation module 321 also selects from the card templates stored in the merchant account management module 311 a template, e.g., a card image, which corresponds to the membership card requested by the user, as the body of the membership card, as shown in block 802. Next, in block 803, the card generation module 321 synthesizes the card body and the 2-dimensional bar code or other codes which embed thereon the merchant information and the user information (i.e., the unique identification information of the virtual membership card). For example, the 2-dimensional bar code or other codes can be printed (superposed) on the card body, like the conventional 2-dimensional bar code membership card; alternatively, the 2-dimensional bar code or other codes can be embedded into the card body in form of watermark. The virtual membership card thus generated can be transmitted to the MMSC module 213 through the MMS interface part 333 in the network adaptation/integration interface 201, so as to be delivered to the mobile phone 402 of the user 103 in the form of multimedia message. The membership card generated in the above manner has an appearance similar to that of conventional membership cards and is easy for recognition. According to an alternative embodiment, the 2-dimensional bar code or other codes (the unique identification information of the virtual membership card) can also be directly sent to the user as the virtual membership card, and the advantage of doing so is that only small memory space is needed for storing the membership card. According to a preferred embodiment, the operator 102 also acts as a trusted third party between the merchant 101 and the user 103. Specifically, the operator 102 may use a digital signature means (not shown) to digitally sign the generated virtual membership card with its own private key. The user 103 may, at any time, use the public key published by the operator 102 to validate its signature. In this manner, the operator 102 assures the user that the virtual membership card is issued by a particular merchant.

Figure 6:
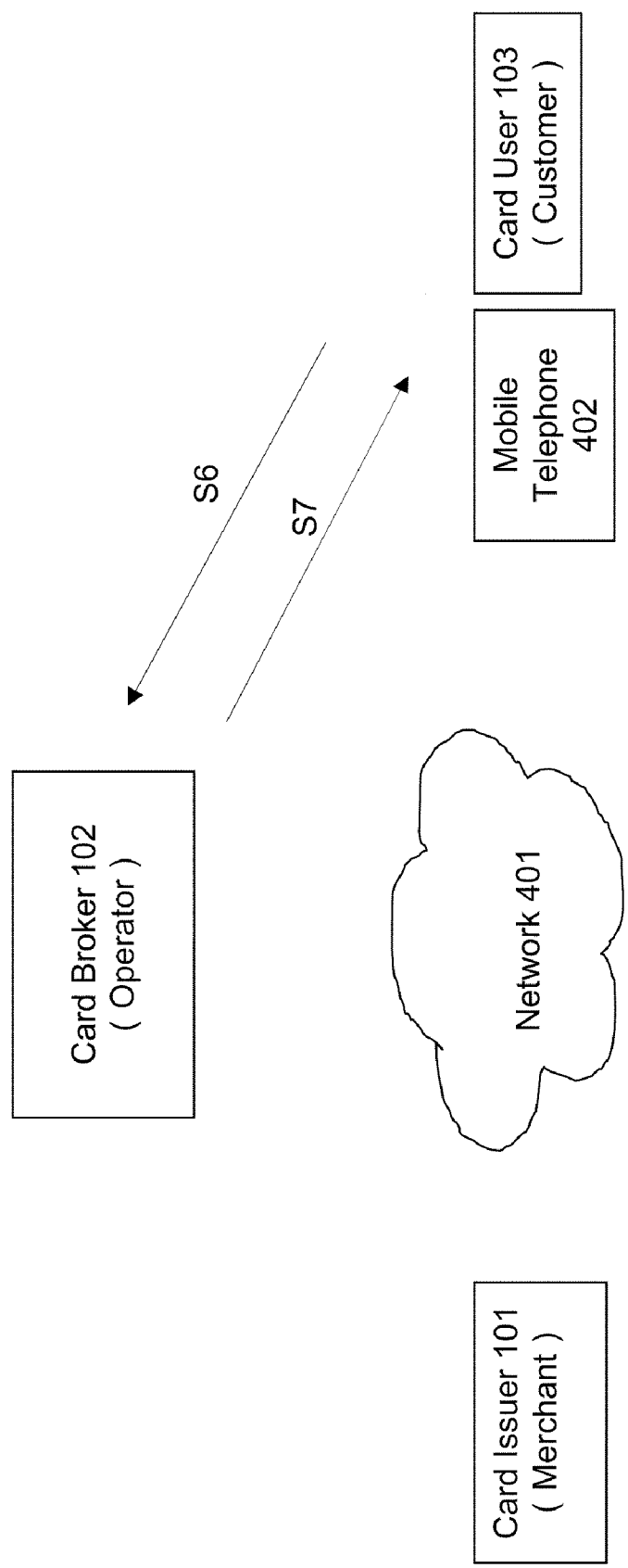

FIG. 6 illustrate the scenario when the user 103 requests retrieval of his/her virtual membership card from the operator 102. After delivering the virtual membership card to the user 103's mobile phone 402 as explained above in conjunction with FIG. 5, the user 103 may store it in the internal memory of the mobile phone 402 or removable storage means on the mobile phone 402, for later reading during use. On the other hand, if the user's mobile phone 402 does not have enough memory space to store all the membership cards, or if the user loses a certain membership card, for example, deletes a certain membership card, according to the present invention, he/she can easily request retrieval of his/her membership card from the operator 102 (system 100) by means of mobile phone 402, as indicated by the arrow S6. The user may submit the request to the virtual membership card system 100 via short message, voice message, and the like. After the user account management module 312 in the virtual membership card system 100 has validated the user who submits the request, the card distribution module 322 sends the requested membership card to the mobile phone 402 of the user 103 in the form of MMS, as indicated by the arrow S7. In this manner, the user may retrieve his/her membership card at any place and at any time, without having to carry many cards or being troubled by forgetting to take or losing a card, as in the case of conventional membership cards.

Figure 10:
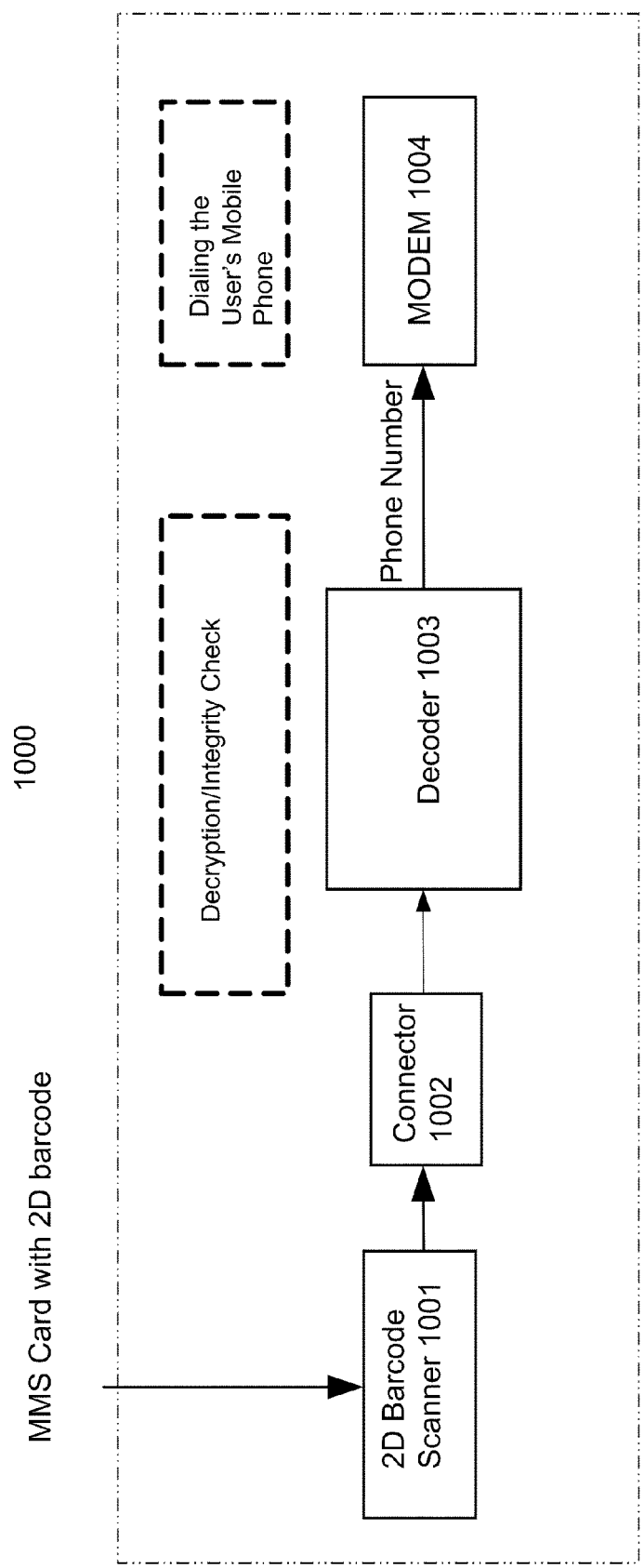
FIG. 10 shows the functional block diagram of the virtual membership card reading device according to an embodiment of the present invention.

When the user uses the virtual membership card, the membership card is fetched from the memory of the mobile phone 402, and displayed on the screen of the mobile phone 402. The user may present the membership card displayed on the screen of the mobile phone 402 to the merchant who issues the membership card, for reading by the card reading device provided at the merchant. FIG. 10 illustrates the functional block diagram of the virtual membership card reading device 1000 in accordance with the preferred embodiment of the present invention. The virtual membership card reading device 1000 corresponds to the embodiment in which the 2-dimensional bar code and the card image are added to form the membership card. As shown in FIG. 10, the 2-dimensional bar code scanner 1001 in the reading device 1000 scans the virtual membership card displayed on the screen of the user's mobile phone 402, and converts it into digital signals. Via a connector 1002, e.g., a RS232 connector, the serial output signals of the 2-dimensional bar code scanner 1001 are sent to the decoder 1003. The decoder 1003 decrypts the 2-dimensional bar code with the merchant 101's decryption key in the storage means (not shown) in the reading device 1000 to obtain the merchant information and user information embedded therein. The decrypted merchant information, e.g., the license number or institution code may serve as a token which enables the merchant to make sure that the membership card is issued by itself. According to the present invention, only the merchant 101 who issues the membership card or those institutions authorized by the merchant (for example, merchant 101's partners who own the merchant 101's decryption key) can decrypt the membership card, so as to protect the user's privacy and avoid forgery and tampering of the membership card. According to a preferred embodiment, the user information includes the user's mobile phone number, the mobile phone number obtained through decryption is sent to the modem 1004, and the latter automatically dials the user's mobile phone 402. In response, the user's mobile phone 402 rings. According to the ringing, the merchant 101 may determine that the user who holds the mobile phone 402 is the legal owner of the membership card. The automatic dialing may also be implemented in other ways, e.g., by sending a short message. In this manner, the identity of the user is validated.

Figure 9:
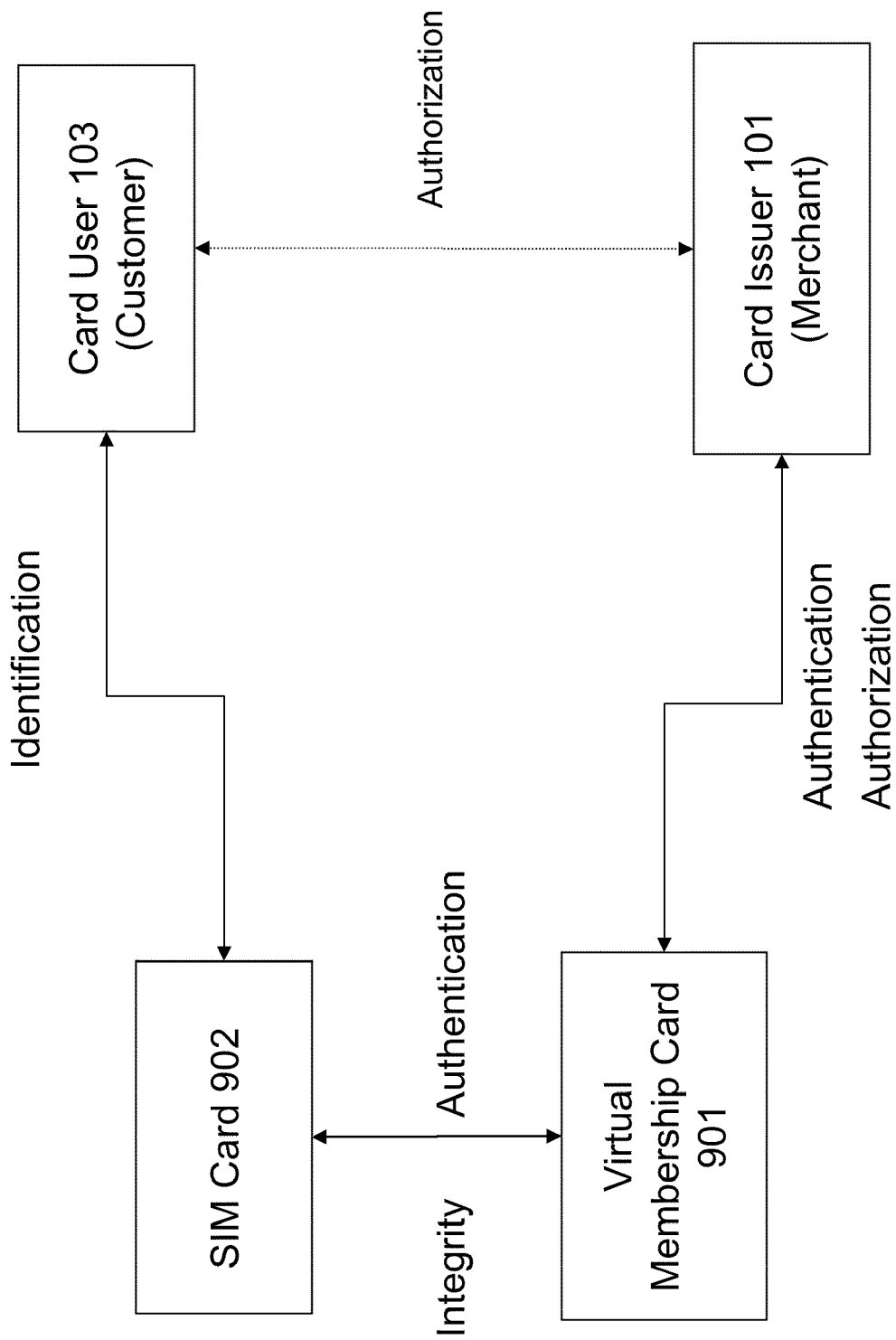
FIG. 9 illustrates schematically the relationship among the user, the merchant, the virtual membership card and the SIM card in the virtual membership mechanism according to a preferred embodiment of the present invention.

Such a validation procedure by decrypting the phone number embedded in the virtual membership card and then dialing the number is to associate the virtual membership card uniquely with the user's mobile phone 402. FIG. 9 illustrates the relationship among the card user 103, merchant 101, virtual membership card 901 and SIM card 902 in the virtual membership card mechanism according to the preferred embodiment of the present invention. Each mobile phone has a SIM card 902 mounted therein, and the SIM card 902 is associated uniquely with a phone number. The same SIM card cannot be owned by a plurality of users at the same time, and thus the SIM card 902 can serve as an identification of the user. The present invention embeds the user information including the phone number into the virtual membership card 901, so as to associate the virtual membership card 901 uniquely with the SIM card 902 and in turn with the user 103. Therefore, only the user holding the mobile phone which corresponds to the phone number embedded in the virtual membership card can be validated. In the case where the virtual membership card is forwarded to another person's mobile phone, when said another person presents the membership card to the merchant 101, and the reading device 1000 obtains the phone number embedded in the membership card by decryption and automatically dials the number, the mobile phone of said another person will not ring, that is to say, the another person cannot be validated. In this manner, forwarding the membership card via telecommunication network is prevented.

Those skilled in the art may appreciate that, in the case where the virtual membership card identification information is embedded into the card body as a watermark, the virtual membership card reading device 1000 shall also include a watermark extraction means (not shown). The watermark extraction means may extract the information embedded in the card body in a known way. Moreover, in the above example, it is the merchant 101 that performs the decryption and validation of the virtual membership card. According to an alternative embodiment, the merchant 101 may send the virtual membership card information it reads to the card validation module 323 in the virtual membership card system 100 via the network 401. The card validation module 323 may perform decryption functions similar to the decoder 1003, so that the decryption and validation are performed at the operator 102, which simplifies the function of the reading device 1000. This kind of validation may be combined with the above-mentioned automatic dialing the decrypted mobile phone number. That is to say, the 2-dimensional bar code scanner 1001 sends the information it reads to the operator 102 via the network 401, and the operator 102 decrypts and automatically calls the user's mobile phone 402. In response, the user's mobile phone 402 rings. According to the ringing, the merchant 101 may determine that the user holding the mobile phone 402 is the legal owner of the virtual membership card.

Figure 7:
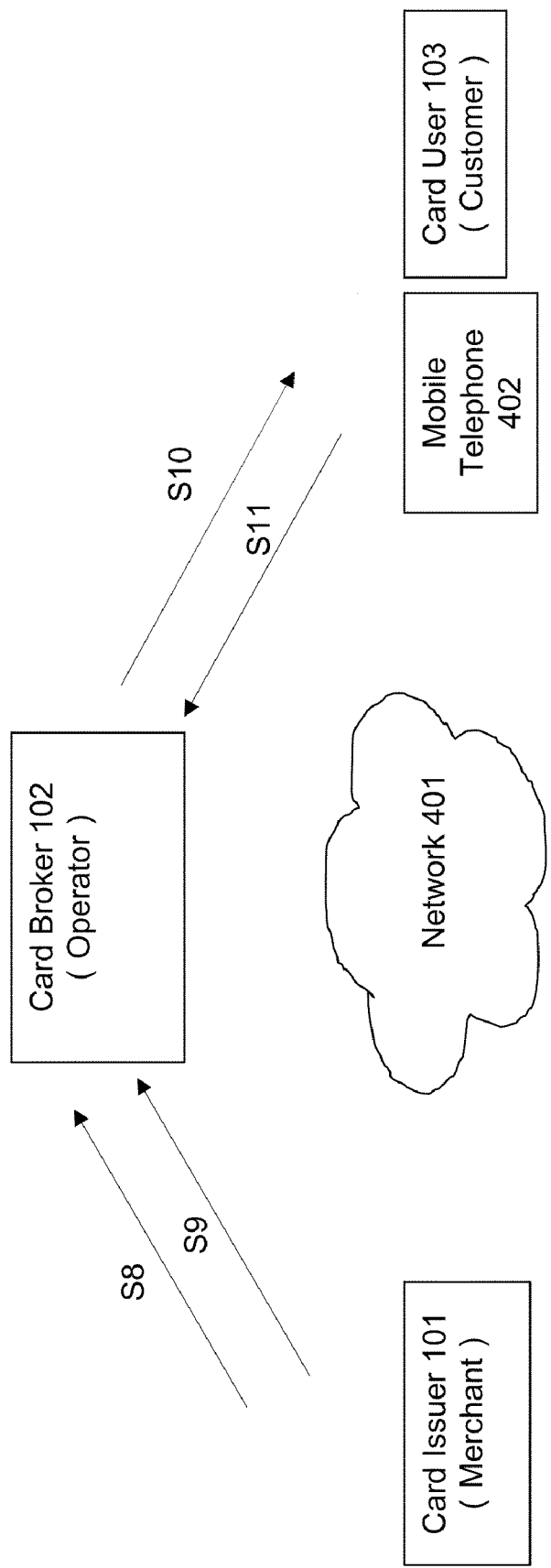

FIG. 7 illustrates the scenario when the merchant 101 manages the membership cards it issues and the user 103 manages his/her own membership cards. The merchant 101 may manage its membership cards via the merchant membership card self-service portal 221 provided by the operator 102, as indicated by the arrow S8. For example, the merchant 101 may place the membership card of a certain user in disablement status, or re-enable the membership card of a certain user. The merchant 101 may also send promotion information to its customers via the network 401, as indicated by the arrow S9. The user 103 may receive the promotion information via the network 401 with the mobile phone 402, as indicated by the arrow S10. The promotion information may include, for example, the membership cards automatically distributed by the merchant, and may be sent to the user's mobile phone 402 in form of SMS, MMS, WAP push, and the like. The user may manage his/her membership cards through the online WAP portal, as indicated by the arrow S1. For example, the user may check the use history of the membership card, change the password, amend the user information, and cancel the membership card, and so on.

The present invention has been described above with reference to the preferred embodiments, in which the telecommunication operators build the platform for providing virtual membership card. The merchants may generate, distribute and manage the membership cards through the platform conveniently. The user may retrieve his/her membership card at any place and at any time, without having to carry a large number of membership cards as in the prior art. In the present invention, the merchant information and the user information (mobile terminal information) are embedded in the membership card. The present invention ensures that the membership card is issued by a certain merchant while preventing forgery, and ensures that the membership card cannot be illegally used by being forwarded.

It should be noted that, the description of the preferred embodiment is only for illustration and shall not be understood as limiting. For example, the virtual membership card may not only serve as an identification of the user, but also has a deposit function. In the description, the present invention is explained using the mobile phone as an example of the tool for applying, receiving, storing and using the virtual membership card. However, those skilled in the art may understand that the present invention is not limited to this, and other mobile terminals such as a personal digital assistant (PDA) and a notebook computer can be used instead. Alternatively, the user may use different communication tools in combination. For example, the steps of registering and applying for obtaining the virtual membership card may be performed by fixed communication terminals like a desktop computer or a fixed telephone, and the steps for receiving, storing and retrieving the membership card may be performed by mobile terminals. In addition, the present invention may also be used in combination of the conventional membership card mechanism. For example, the virtual membership card of the present invention may be used as an auxiliary card of the conventional membership card made of the tangible physical medium.

Moreover, the present invention may be embodied as computer program product, and can be accessed from a computer readable medium. The computer readable medium provides program code for use in conjunction with computers or any other instruction executing systems. The computer readable medium may be electronic, magnetic, optical, electromagnetic, infra and semiconductor devices. The specific examples of computer readable medium include semiconductor or solid memory, magnetic tape, removable disk, random access memory (RAM), read only memory (ROM), hard disk and optical disk. The current examples of optical disk include CD-ROM, CD-R/W, and DVD, etc.

Those skilled in the art may make various modifications and changes without departing the spirit and scope of the present invention. The protection scope of the present invention shall be defined by the claims appended.

The invention claimed is:

1. A method for providing virtual membership cards, including the following steps performed by a card broker:
generating a virtual membership card based on information of a card issuer and information of a user, the virtual membership card including information of the card user which can uniquely identify the card user to a use location; and
sending the virtual membership card to a mobile terminal of the user through a communication network.

2. The method of claim 1, wherein the method further includes the step of receiving information of more than two card issuers and information of more than one card user.

3. The method of claim 1, wherein the card broker is a telecommunication operator, the mobile terminal of the card user is a mobile phone, and the information which can uniquely identify the card user is the number of the mobile phone.

4. The method of claim 1, wherein the step of generating a virtual membership card includes: encoding and encrypting the information of the card issuer and the information of the card user based on an encryption key of the card issuer, and using the resultant information as a virtual membership card.

5. The method of claim 4, wherein after encoding and encrypting the information of the card issuer and the information of the user, the resultant information is combined with a selected card image to serve as a virtual membership card.

6. The method of claim 1, wherein the step of encoding and encrypting the information of the card issuer and the information of the user produces a 2-dimensional bar code, and the 2-dimensional bar code is superposed on the card image or is embedded in the card image in form of watermark.

7. The method of claim 1, wherein before sending the virtual membership card to the mobile terminal of the user though the communication network, the card broker digitally signs the virtual membership card.

8. The method of claim 1, wherein before sending the virtual membership card to the mobile terminal of the user though the communication network, the card broker notifies the card user of the generation of the virtual membership card.

9. A virtual membership card system, including:
a membership management module, for managing card issuer account information, card user account information, and virtual membership card information; and
a virtual membership card management module, including:
a card generation module, for generating a virtual membership card based on information of a card issuer and information of a card user, the virtual membership card including information of the card user which can uniquely identify the card user to a use location; and
a card distribution module, for sending the virtual membership card to a mobile terminal of the user though a communication network.

10. The system of claim 9, wherein the system receives information of more than two card issuers and the information of more than one card users.

11. The system of claim 9, wherein the card broker is a telecommunication operator, and the mobile terminal of the card user is a mobile phone, and the information which can uniquely identify the card user is the number of the mobile phone.

12. The system of claim 9, wherein the card generation module encodes and encrypts the information of the card issuer and the information of the user based on an encryption key of the card issuer, and uses the resultant information as the virtual membership card.

13. The system of claim 12, wherein the card generation module, after encoding and encrypting the information of the card issuer and the information of the card user, combines the resultant information with a selected card image as the virtual membership card.

14. The system of claim 9, wherein the system further includes a digital signature module for digitally signing the virtual membership card.

15. The system of claim 9, wherein the system further includes a card notification module for notifying the card user of the generation of the virtual membership card before sending the virtual membership card to the mobile terminal of the user though the communication network.

16. The system of claim 9, wherein the system further includes a use location comprising a scanner for scanning the virtual membership card and a card validation module, for decoding and decrypting the virtual membership card.

17. The system of claim 9, wherein the system further includes a network interface portion, through which the information of the card issuer and the information of the card user can be communicated.

18. A virtual membership card reading method, including the following steps:
scanning a virtual membership card displayed on a mobile terminal which is provided by a card broker, to convert it into a digital signal; and
decoding and decrypting the digital signal to obtain information of a card issuer and information of the card user embedded therein.

19. The method of claim 18, wherein the mobile terminal is a mobile phone, the information of the card user is the number of the mobile phone, and the method further includes a step of dialing the mobile phone number obtained through decoding and decryption.

20. The method of claim 19, wherein after the virtual membership card is scanned and converted into a digital signal, the digital signal is sent to the card broker, and the card broker decodes and decrypts the digital signal and dials the mobile phone number.

* * * * *